United States Patent [19]

Bunner et al.

[11] Patent Number: 4,743,787

[45] Date of Patent: May 10, 1988

[54] BRUSH WEAR INDICATOR HAVING VARIABLE LIGHT ENERGY CONDUCTOR PATH

[75] Inventors: James E. Bunner; Kenneth R. Reynolds, both of Erie, Pa.

[73] Assignee: General Electric Company, Salem, Va.

[21] Appl. No.: 930,286

[22] Filed: Nov. 13, 1986

[51] Int. Cl.[4] .......... H02K 13/00

[52] U.S. Cl. .......... 310/242; 310/245; 250/227

[58] Field of Search .......... 310/239-242, 310/244-249, 229-230, 43, 219, 233; 200/61.4; 250/227, 561; 340/648; 408/16; 318/542, 361

[56] References Cited

U.S. PATENT DOCUMENTS

| | | | |
|---|---|---|---|
| 3,526,797 | 9/1970 | Jueschke | 310/245 |
| 4,170,731 | 10/1979 | Howell et al. | 250/227 |
| 4,184,145 | 1/1980 | Fima | 340/52 A |
| 4,315,147 | 2/1982 | Harmer | 250/221 |
| 4,344,009 | 8/1982 | Reynolds | 310/242 |
| 4,344,072 | 8/1982 | Harper | 310/242 |
| 4,348,608 | 9/1982 | Michael | 310/242 |
| 4,480,184 | 10/1984 | Ely | 250/216 |
| 4,488,078 | 12/1984 | Orton | 310/242 |
| 4,502,823 | 3/1985 | Wronski et al. | 409/134 |
| 4,567,414 | 1/1986 | Berings | 310/240 |

FOREIGN PATENT DOCUMENTS

| | | | |
|---|---|---|---|
| 0101549 | 6/1982 | Japan | 310/247 |

*Primary Examiner*—R. Skudy
*Attorney, Agent, or Firm*—Arnold E. Renner

[57] ABSTRACT

A brush wear indicator for a dynamoelectric machine, such as a direct current motor, comprises a fiber optic conductor coupling an emitter and a detector. The fiber optic conductor is fed into a brush holder where it is supported by a spring holder to which is attached a coiled biasing spring. The fiber optic conductor includes a region of separation where an element actuated by the biasing spring operates to complete or interrupt a light path between the exposed ends of the conductor at the separation. In one embodiment, an angulated tab secured to the spring operates as a shutter to move in and out of the spring holder to complete or interrupt the light path, while in a second embodiment, a rubber flexible diaphragm having an inwardly projecting body portion is actuated by the spring, by moving in and out of said region of separation to complete or interrupt the light path. The diaphragm, moreover, forms one part of a protective enclosure for the exposed ends of the fiber optic conductor at the region of separation to protect it from becoming contaminated with dirt and other undesired materials.

20 Claims, 1 Drawing Sheet

FIG. 1
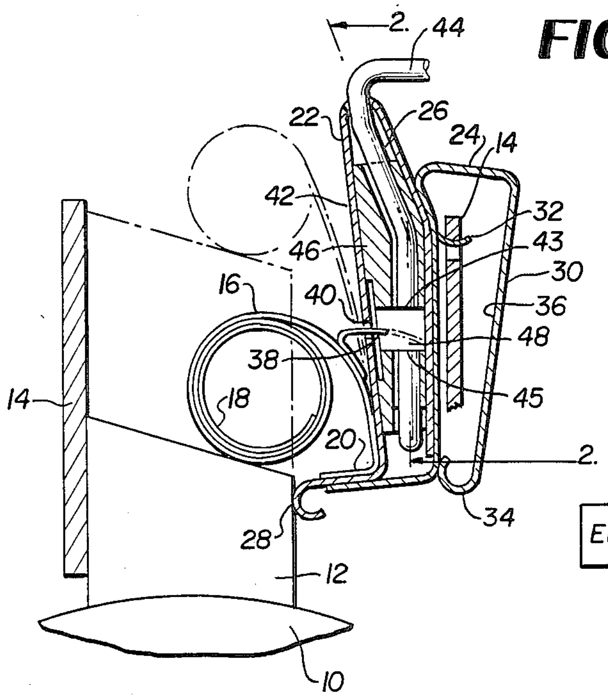
FIG. 2
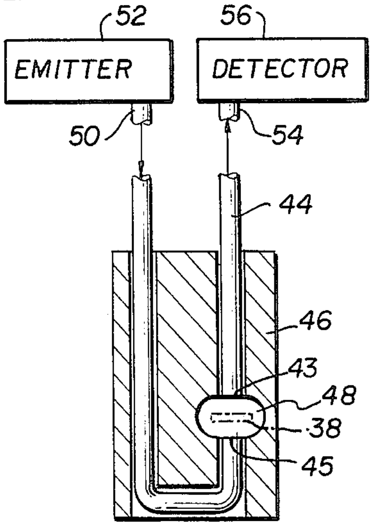
FIG. 3
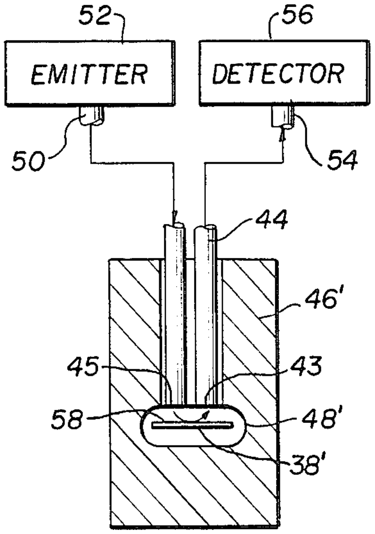
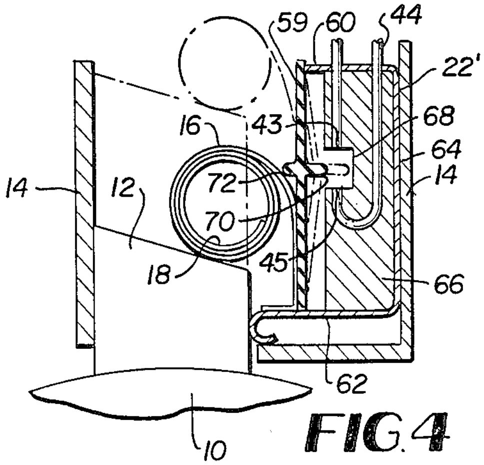
FIG. 4

BRUSH WEAR INDICATOR HAVING VARIABLE LIGHT ENERGY CONDUCTOR PATH

CROSS REFERENCE TO RELATED APPLICATIONS

This application is related to the following applications which are assigned to the assignee of the present invention and which are herein meant to be incorporated by reference:

U.S. Ser. No. 930,288, entitled, "Brush Wear Detector System for Multiple Brushes", filed on Nov. 13, 1986 in the name of James E. Bunner;

U.S. Ser. No. 929,891, entitled, "Light Energy Brush Wear Indicator", filed on Nov. 3, 1986 in the name of Kenneth R. Reynolds; and U.S. Ser. No. 930,287, entitled, "Light Conducting Brush Wear Detector Assembly", filed on Nov. 13, 1986 in the name of Kenneth R. Reynolds.

BACKGROUND OF THE INVENTION

This invention relates generally to brush wear indicators for dynamoelectric machines and more particularly to a brush wear indicator which uses light energy conductors, commonly referred to as fiber optics, in a completed or interrupted light path to signal the existence of a worn brush condition.

Dynamoelectric machines such as direct current motors use carbon brushes to transfer power between an external source of electric power and a rotating commutator associated with the rotor the motor. Since the brushes are in contact with the commutator, they must be periodically replaced after a predetermined amount of wear to assure adequate current conduction and to prevent damage to the commutator. Alternating current machines similarly often employ brushes and slip rings for the transfer of electric power with similar wear problems.

A variety of brush wear indicators are known for signalling the need for brush replacement. Typically, such apparatus includes electrical circuitry whose operation is dependent upon the condition of wear as sensed by movement of a self-winding brush follower spring which applies a biasing force against the rear end of the brush the other end of which is in contact with the commutator or slip ring of a dynamoelectric machine. When the brush is in a new or usable condition, the coil of the spring is in a first position away from the commutator. As the brush wears, the coil eventually reaches a second position near the commutator. This movement is utilized to open or close a set of electrical contacts, which thereby energizes or deenergizes an electrical circuit for signalling the need for brush replacement. Examples of such apparatus include that disclosed in U.S. Pat. No. 4,488,078, entitled, "Brush Wear Detector", issued to Ronald C. Orton on Dec. 11, 1984; U.S. Pat. No. 4,344,009, entitled, "Brush Wear Indicator For A Dynamoelectric Machine Brush", issued to Kenneth R. Reynolds on Aug. 10, 1982; and U.S. Pat. No. 4,348,608, entitled, "Brush Wear Indicator", issued to Richard N. Michael on Sept. 7, 1982.

A second well known type of detector system employs an electrical conductor embedded within the brush. When the brush wears by a predetermined amount, the conductor contacts the commutator (or slip ring) which may serve to complete an electric circuit or, as by wearing through a loop at the end of the conductor, break an existing circuit. In either case, a worn brush condition is indicated. These embedded conductor systems suffer from the two primary deficiencies of having an electrical current carrying member in the current carrying brush and, since the conductor is usually metallic, of a metal to metal contact with the commutator or slip ring.

Accordingly, it is an object of the present invention to provide an improvement in brush wear detectors or indicators.

It is a further object of the invention to detect a worn brush in a dynamoelectric machine using light energy.

It is another object of the invention to provide a brush wear indicator which uses light conductors to keep the electrical conductive members associated with the detection/indicator away from the voltages present in the brush assemblies of the dynamoelectric machine.

And yet a further object of the invention is to provide a fiber optic brush wear detector that is protected from contamination such as dirt and the like.

SUMMARY OF THE INVENTION

The foregoing and other objects are achieved by a shutter member which moves in response to a self-winding coil brush follower spring applying a biasing force against the rear end of a brush. In one embodiment, the shutter member comprises a tab portion associated with the spring, which tab portion moves in and out of an aperture in a spring holder which also contains a separated fiber optic conductor having associated a optical energy emitter and an associated detector coupled to respective ends. The shutter member acts as a switch to block or complete an optical path through the conductor at the point of separation when a worn brush condition is reached, causing a brush replacement indication to be signalled. In another embodiment, the shutter takes the form of an outwardly projecting body member of a rubber diaphragm which is actuated by the spring. The body member also operates to complete or interrupt a light path through a fiber optic conductor at the point of separation. The diaphragm additionally acts to protect the fiber optics from dirt and other contaminants which could render the exposed ends of the fiber optics inoperable.

BRIEF DESCRIPTION OF THE DRAWING

While the present invention is defined in the claims annexed to and forming a part of this specification, a better understanding can be had by reference to the following description taken in conjunction with the accompanying drawing, in which:

FIG. 1 is a schematic side elevation, partly in cross section, illustrating a brush wear detector according to one embodiment of the invention.

FIG. 2 is a sectional view of FIG. 1 taken along the lines 2—2 thereof;

FIG. 3 is a sectional view similar to FIG. 2 and being illustrative of an alternative arrangement to that shown in FIG. 2; and FIG. 4 is a schematic side elevation, partly in cross section, illustrating an additional embodiment of the invention.

DESCRIPTION OF THE PREFERRED EMBODIMENTS

Referring now to the drawings and more particularly to FIG. 1, reference numeral 10 denotes the fragmentary portion of a commutator or slip ring of a dynamoelectric machine. As is well known, such a machine is comprised of two main parts, a stator assembly and a rotor assembly. The element 10 forms a part of the rotor assembly. Power transferred to the rotor is accomplished by means of a brush assembly including one or more brushes 12 which are in slidable contact with the element 10. The brush assembly, moreover, is contained within a brush holder or box 14 which is secured to the stator assembly of the motor. One or more electrical leads, not shown, are normally embedded into the brush(s) 12 to provide connection to an external power source or electrical circuit, also not shown.

As shown in FIG. 1, the brush 12 is urged inwardly by the force applied from a self-winding follower spring 16, whose outer end comprises a prestressed spiral coil portion 18, while the inner end 20 is secured to a spring holder member 22 fastened to a support member 24. The spring holder member 22 comprises a sheet metal member bent back or folded on itself to include an inner space region 26 and a curled end portion 28 which is adapted to contact the brush 12. The member 24 is also comprised of sheet metal and includes a retention hook 32. This spring assembly is of the general type described in U.S. Pat. No. 3,526,797, "Stabilizing Spring Assembly for Brushholder", by N.F. Jueschke, which issued Sept. 1, 1970.

The spring 16 has an associated angulated tab 38 which acts as a shutter and which projects through a slot or opening 40 formed in the front wall section 42 of the spring holder member 22.

Further as shown in FIG. 1, a light energy conductor, e.g., a fiber optic conductor 44 having exposed inner ends 43 and 45 (FIG. 2) is positioned within the region 26 of the spring holder member 22 and is supported thereat by an irregularly formed block member 46. The block member 46 also includes a cavity 48, at the exposed ends 43 and 45 of the fiber optic conductor 44, within which the tab 38 can move (inwardly or outwardly) depending upon the coiled position of the spring 16 to complete or interrupt the passage of light energy in the fiber optic conductor 44.

Accordingly, as brush 12 wears due to the frictional contact with the commutator 10, the rear end of the brush moves from the phantom position as shown in FIG. 1 to an inward position, whereupon the coil portion 18 of spring 16 rolls into a spiral as shown. Tab 38, as well as slot 40 and cavity, are specifically located relative to one another so that when a new or usable brush 12 is positioned within the brush holder 14, the spring is extended outwardly, causing the tab 38 to move farther into the cavity 48 to alter (interrupt or complete) light energy passing between the exposed ends 43 and 45 of the fiber optic conductor 44. For a worn brush condition, however, the spring 16 coils up as shown in FIG. 1. This action operates to pull the tab 38 away from the exposed ends of the fiber optic conductor 44.

This leads to two possible operational modes, one being to interrupt or block the passage of light, and the other to complete or make an optical energy path. This now leads to a consideration if FIGS. 2 and 3.

With reference to FIG. 2, the fiber optic conductor 44 has one end 50 connected to an emitter or source 52 of light energy, while its opposite end 54 is connected to a detector of light-energy 56. The conductor 44 is arranged in the block number 46 in the form of a U-shaped loop with one leg being separated at the location of the cavity 48. In such an arrangement, the tab 38 operates to block or interrupt light energy transmission between the exposed ends 43 and 45 and accordingly between the emitter 52 and detector 56 until a worn brush position is reached, whereupon the tab 38 retracts as shown in FIG. 1 to permit completion of the light path between the emitter 52 and the detector 56 across the cavity 48. Upon receiving light energy from the emitter 52, the detector signals a worn brush condition which will remain until a new brush 12 is inserted within the holder 14, causing the tab 38 to again block conduction of light within the fiber optic conductor 44.

FIG. 3, on the other hand, discloses an arrangement for a reverse operation where a new brush condition causes a completion of the optical path while a worn brush condition breaks the optical path. As shown in FIG. 3, the two legs of the fiber optic conductor are located in a modified block member 46' such that both exposed ends 43 and 45 terminate side by side at an enlarged, i.e. wider cavity 48'. The spring 16, not shown, now includes a relatively wider tab 38' which includes a reflective surface 58 on one side which acts to couple light from the emitter 52 to the detector 56 as long as the tab 38' is positioned adjacent the exposed ends 43 and 45 of the optical conductor 44.

A further embodiment of the invention is shown in FIG. 4. There the shutter takes the form of a resilient diaphragm 59 which is flexed by the spring 16. The diaphragm 59 extends between two side walls 60 and 62 of a modified spring holder member 22'. The holder member 22', moreover, includes a rear wall 64 which is attached to the brush holder 14.

A closed protective casing is thus provided for the exposed ends 43 and 45 of the fiber optic conductor 44 which is held in position by a support member 66 which extends between the side walls 60 and 62. Moreover, the support member 66 includes a recess or cavity 68 which permits an outwardly projecting body portion 70 of the diaphragm 59 to move in and out of the recess 68 between the exposed ends 43 and 45 of the fiber optic conductor 44. The diaphragm additionally includes another outwardly projecting body portion 72 which contacts the spring 16.

In operation, for a new brush condition, the spring 16 is extended as shown by the phantom lines of FIG. 4. This urges the diaphragm 59 inward so that the body portion 70 operates to interrupt light conduction in the fiber optic conductor 44. However, when the brush reaches a worn condition, the spring 16 has coiled to the extent that the diaphragm retracts, causing the body portion 70 to be pulled out of the recess 68, whereupon a light conducting path is completed through the conductor in the same fashion as shown in FIG. 2, causing light to be coupled from the emitter 52 to the detector 56.

This arrangement is particularly useful since the exposed ends 43 and 45 of the fiber optic conductor 44 are protected from becoming contaminated with dirt and other materials in the operating environment of the machine which would tend to render the fiber optics inoperable. It is to be noted that the embodiment of FIG. 4 could also employ the reflective type system as illustrated with respect to FIG. 3.

Thus what has been shown and described is a fiber optic brush wear indicator which utilizes light conducting members which acts to keep the electrical conductive wires associated with other types of wear detectors away from the voltages inherently present in the brush assemblies of dynamoelectric machines.

Having thus shown and described what are at present considered to be the preferred embodiments of the invention, it should be noted that the same has been made by way of illustration and not limitation. For example, in the embodiment shown in FIG. 1, the tab member is illustrated as being attached to the spring. Other arrangements such as a separate spring member located between the spring 16 and member 22 and secured in the region of end 20 could also be used. Accordingly, all modifications, alterations and changes coming within the spirit and scope of the invention are herein meant to be included.

We claim:

1. A brush wear indicator assembly for a dynamoelectric machine comprising, in combination:
   - a brush holder;
   - at least one brush located within said holder;
   - brush biasing means in contact with said brush and operating to force the brush against an electrically conductive member of said machine;
   - a source of light energy and a detector of light energy;
   - light energy conductor means, coupled between said source and said detector, having a region of separation to provide a pair of exposed inner ends adjacent said biasing means, said exposed inner ends defining a path for light energy conduction; and
   - shutter means, actuated by the movement of said biasing means in response to brush wear, located at said region of separation and being operable to alter said path between a state of light energy conduction and a state of non-conduction whereby at a wear position of said brush said detector detects a worn bush condition.

2. The brush wear detector assembly as defined by claim 1 wherein said light energy conductor means comprises fiber optic conductor means.

3. The brush wear detector assembly as defined by claim 1 wherein said biasing means comprises a spring.

4. The brush wear detector assembly as defined by claim 3 wherein said spring comprises a self-winding spring including a coil portion.

5. The brush wear detector assembly as defined by claim 4 wherein said shutter means actuated by movement of said biasing means comprises an outwardly projecting member attached to the spring which moves into position at the region of separation for a first brush wear condition and out of position at said region of separation for a second brush wear condition.

6. The brush wear detector assembly as defined by claim 5 wherein said projecting member moves into position to interrupt the path for light energy conduction and out of position to complete the path for light energy conduction.

7. The brush wear detector assembly as defined by claim 5 wherein said projecting member moves into position to complete the path for light energy conduction and moves out of position to interrupt the path for light energy conduction.

8. The brush wear detector assembly as defined by claim 1 wherein said biasing means comprises a self-winding spring having a coil portion, and wherein said shutter means operable to alter said path for light energy conduction comprises a tab on said coil portion projecting toward said region of separation, said spring being operable in a first wear condition of said brush to position said tab into said region of separation adjacent said exposed inner ends of said conductor means and being operable for a second wear condition to remove said tab from said region of separation.

9. The brush wear detector assembly as defined by claim 8 and additionally including a spring holder member mounted on said brush holder, said spring holder member including means for supporting said light energy conductor means and having an aperture therein for the passage of said tab to said region of separation.

10. The brush wear detector assembly as defined by claim 9 wherein said self-winding spring includes an outer end portion which coils in a self-winding spiral portion and an inner end portion attached to said spring holder member, said tab projecting through said aperture in said spring holder member, said aperture being located at a transition region of said spring between said spiral portion and said inner end portion.

11. The brush wear detector assembly as defined by claim 9 wherein said spring holder member comprises a member folded back on itself to provide an inner space region, said means for supporting said light energy conductor means being located in said inner space region.

12. The brush wear detector assembly as defined by claim 11 wherein said means for supporting said light energy conductor means includes a cavity at said exposed inner ends of said conductor means into which said tab is projectable.

13. The brush wear detector assembly as defined by claim 12 wherein said spring holder member includes a front wall portion containing said aperture, said aperture further being adjacent to said cavity.

14. The brush wear detector assembly as defined by claim 13 wherein said light energy conductor means comprises a fiber optic conductor.

15. The brush wear detector assembly as defined by claim 1 wherein said shutter means actuated by the movement of said biasing means comprises a flexible resilient diaphragm mounted adjacent said biasing means and having projection means projecting outwardly therefrom which is movable to and from said exposed inner ends of said conductor means at said region of separation.

16. The brush wear detector assembly as defined by claim 15 wherein said projection means comprises an outwardly projecting body portion of said diaphragm.

17. The brush wear detector assembly as defined by claim 15 wherein said biasing means comprises a spring.

18. The brush wear detector assembly as defined by claim 15 additionally including a spring holder member located on said brush holder, wherein said spring comprises a self-winding spring, having a coil portion, secured at one end to said spring holder member, said diaphragm being further attached to said spring holder member and having another outwardly projecting body portion of said diaphragm in contact with said spring so as to move said diaphragm and said first recited body portion to and from said region of separation.

19. The brush wear detector assembly as defined by claim 18 wherein said spring holder member includes a pair of side walls and a back wall between said side walls and wherein said diaphragm forms a front wall, thereby providing an enclosure, said inner ends of said light energy conductor means and said region of separation being located in said enclosure so as to be protected from dirt and other contaminants which could render said conductor means inoperable.

20. The brush wear detector assembly as defined by claim 19 wherein said light energy conductor means comprises a fiber optic conductor.

* * * * *